(12) United States Patent
Infante-Lopez (10) Patent No.: US 10,262,077 B2
(45) Date of Patent: Apr. 16, 2019

(54) SYSTEMS AND METHODS FOR PATTERN MATCHING AND RELATIONSHIP DISCOVERY (71) Applicant: INTEL CORPORATION, Santa Clara, CA (US)

(72) Inventor: Gabriel G. Infante-Lopez, Cordoba (AR)

(73) Assignee: Intel Corporation, Santa Clara, CA (US)

( * ) Notice: Subject to any disclaimer, the term of this patent is extended or adjusted under 35 U.S.C. 154(b) by 26 days.

(21) Appl. No.: 14/318,015

(22) Filed: Jun. 27, 2014

(65) Prior Publication Data
US 2015/0379158 A1 Dec. 31, 2015

(51) Int. Cl.
G06F 17/30 (2006.01)
(52) U.S. Cl.
CPC .............................. G06F 17/30958 (2013.01)
(58) Field of Classification Search
CPC ................................................ G06F 17/30958
USPC .......................................................... 707/798
See application file for complete search history.

(56) References Cited

U.S. PATENT DOCUMENTS

| | | | | |
|---|---|---|---|---|
| 9,396,287 | B1* | 7/2016 | Bhave | G06F 17/30979 |
| 9,483,733 | B2* | 11/2016 | Ait-Mohktar | G06F 17/30929 |
| 2004/0060007 | A1* | 3/2004 | Gottlob | G06F 17/30932 |
| | | | | 715/234 |
| 2005/0022115 | A1* | 1/2005 | Baumgartner | G06F 17/30911 |
| | | | | 715/205 |
| 2006/0271526 | A1* | 11/2006 | Charnock | G06Q 30/02 |
| 2009/0138494 | A1* | 5/2009 | Goyal | G06F 17/30985 |

(Continued)

FOREIGN PATENT DOCUMENTS

TW I267025 B 11/2006

OTHER PUBLICATIONS

NPL 1 name: Extending SPARQL with Regular Expression Patterns (for Querying RDF). Title Extending SPARQL with Regular Expression Patterns (for Querying RDF), J. Web Semantics: Science, Services and Agents on the World Wide Web, 7(2):57-73, Apr. 2009, by Faisal Alkhateeb, Jean-Francois Baget, and Jerome Euzenat, pp. 1-48.*

(Continued)

Primary Examiner — Hicham Skhoun
(74) Attorney, Agent, or Firm — Schwabe, Williamson & Wyatt, P.C.

(57) ABSTRACT

Methods and systems for pattern matching and relationship discovery in graphs. The graph may be adapted as an actor graph, where vertices may include processing functionality and executable logic. The vertices of an actor graph may send messages to other vertices to which they are connected. A first vertex may receive an initial regular expression. The first vertex may evaluate which of its edges and/or respective vertices connected to these edges satisfy a first condition in the initial regular expression. If the first condition is met by an edge and or its connected vertex, the initial regular expression may be modified, if necessary, to reflect that the first condition has been met. The modified expression is then communicated to the connected vertex. The identity of the edge and/or the connected vertex may be recorded. A subsequent vertex may then proceed in a similar manner as the first vertex.

23 Claims, 6 Drawing Sheets (56) References Cited

U.S. PATENT DOCUMENTS

| | | | | |
|---|---|---|---|---|
| 2011/0103682 | A1* | 5/2011 | Chidlovskii | G06K 9/6284 |
| | | | | 382/159 |
| 2011/0265011 | A1 | 10/2011 | Taylor et al. | |
| 2012/0137367 | A1* | 5/2012 | Dupont | G06F 21/00 |
| | | | | 726/25 |
| 2012/0158791 | A1* | 6/2012 | Kasneci | G06F 17/30958 |
| | | | | 707/798 |
| 2014/0032607 | A1* | 1/2014 | Hussain | G06F 17/30958 |
| | | | | 707/798 |
| 2014/0136555 | A1* | 5/2014 | Jacob | G06F 17/30958 |
| | | | | 707/754 |
| 2014/0258980 | A1* | 9/2014 | Bagheri | G06F 8/60 |
| | | | | 717/120 |
| 2015/0032725 | A1* | 1/2015 | Barykin | G06F 17/30327 |
| | | | | 707/722 |
| 2015/0324457 | A1* | 11/2015 | McLean | G06F 17/30958 |
| | | | | 707/758 |
| 2015/0350259 | A1* | 12/2015 | Garg | H04L 67/10 |
| | | | | 709/203 |

OTHER PUBLICATIONS

Search Report dated Mar. 30, 2017 for Taiwan Patent Application No. 104116253, 1 page.

* cited by examiner

SYSTEMS AND METHODS FOR PATTERN MATCHING AND RELATIONSHIP DISCOVERY

TECHNICAL FIELD

Embodiments described herein relate to relationship discovery in large datasets.

BACKGROUND

Data may commonly be modeled as a graph. A graph typically represents a number of entities as a set of respective vertices. Vertices may represent any of a variety of entities, e.g., people, objects, or geographical locations, for example. A graph includes edges connecting at least some of the vertices, where the edges represent relationships between entities represented by the vertices. An edge may be assigned a value or weight, further modeling the relationship between entities. In an example, a graph may represent a geographical region, where vertices represent cities or other locations in the region. An edge between two vertices may represent physical connectivity between the represented locations, e.g., the fact that one can drive from one of the locations to the other. Such an edge may be assigned a value corresponding to driving distance or travel time, for example. In another example, a graph may be used to model a social network, where each person is represented by a vertex. An edge between two vertices represents a relationship between the represented people, e.g., a friendship, a familial relationship, or a business relationship. Such an edge may have an associated weight. For example, the weight may represent a degree of friendship or a level of trust between the persons represented by the connected vertices.

A common problem is the discovery of relationships and patterns in data that may be represented by a graph. Such a relationship or pattern may be modeled as a path in the graph. A query as to the presence of such a path is sometimes called a regular path query (RPQ). The significance of regular path queries for data modeled as graphs has grown steadily over the past decade. RPQs often appear in restricted forms, part of graph-oriented query languages such as XQuery/XPath and SPARQL, and have applications in areas such as semantic, social, and biomedical networks.

No method has yet been developed that would be capable of efficiently evaluating general RPQs on large graphs, i.e., with millions of nodes/edges. Existing systems for evaluating RPQs are restricted either in the type of the graph (e.g., only trees), the type of regular expressions (e.g., only single steps), and/or the size of the graphs they can handle.

Currently there exist limited solutions for this problem. One solution is to transform both the query and the graph to automata and compute their intersection. This approach has many disadvantages, mostly in scalability and concurrency. The transformation can be time consuming and it is very hard to re-use one transformation of the graph once the graph has changed.

Another approach exploits the fact that not all labels in a graph are equally frequent. The approach consists of an algorithm which decomposes an RPQ into a series of smaller RPQs using rare labels, i.e., elements of the query with few matches, as way-points. A search thereby is decomposed into a set of smaller search problems. The latter can be parallelized but is nonetheless infeasible when there are few labels.

BRIEF DESCRIPTION OF THE DRAWINGS/FIGURES

In the drawings, the leftmost digit(s) of a reference number may identify the drawing in which the reference number first appears.

DETAILED DESCRIPTION

An embodiment is now described with reference to the figures, where like reference numbers indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

Disclosed herein are methods and systems for pattern matching and relationship discovery in graphs. The graph may be adapted as an actor graph, where vertices may include processing functionality and executable logic. In this sense, the vertices are independent units of computation, or actors, and not just representative of data. Moreover, the vertices of an actor graph may send messages to other vertices to which they are connected.

A first vertex of an actor graph may receive an initial regular expression. This expression represents a query regarding paths in the graph that may satisfy or match the conditions specified by the expression. The first vertex may evaluate which of its edges and/or respective vertices connected to these edges satisfy a first condition in the initial regular expression. If the first condition is met by an edge and or its connected vertex, the initial regular expression may be modified, if necessary, to reflect the fact that the first condition has been met. The modified expression may now include the remaining conditions of the initial regular expression. If modified, the modified expression is then communicated to the connected vertex. If the initial regular expression has not been modified, the initial regular expression is communicated to the connected vertex. The identity of the edge and/or the connected vertex may be recorded. This would allow the rebuilding of the matching path as necessary.

This latter vertex may then proceed in a similar manner as the first vertex, and evaluate the edges and vertices connected to it. If the next condition in the modified expression is met by a particular edge and/or connected vertex, this expression may be further modified, if necessary, to reflect that this latter condition has been satisfied, and sent to that vertex. The process may continue in this manner to discover paths that satisfy the initial regular expression. By discovering such a path, a pattern defined by the initial regular expression may be matched, and one or more relationships may be inferred between the entities represented by the vertices in the path. This process may end when the regular expression is fully satisfied.

Figure 1:
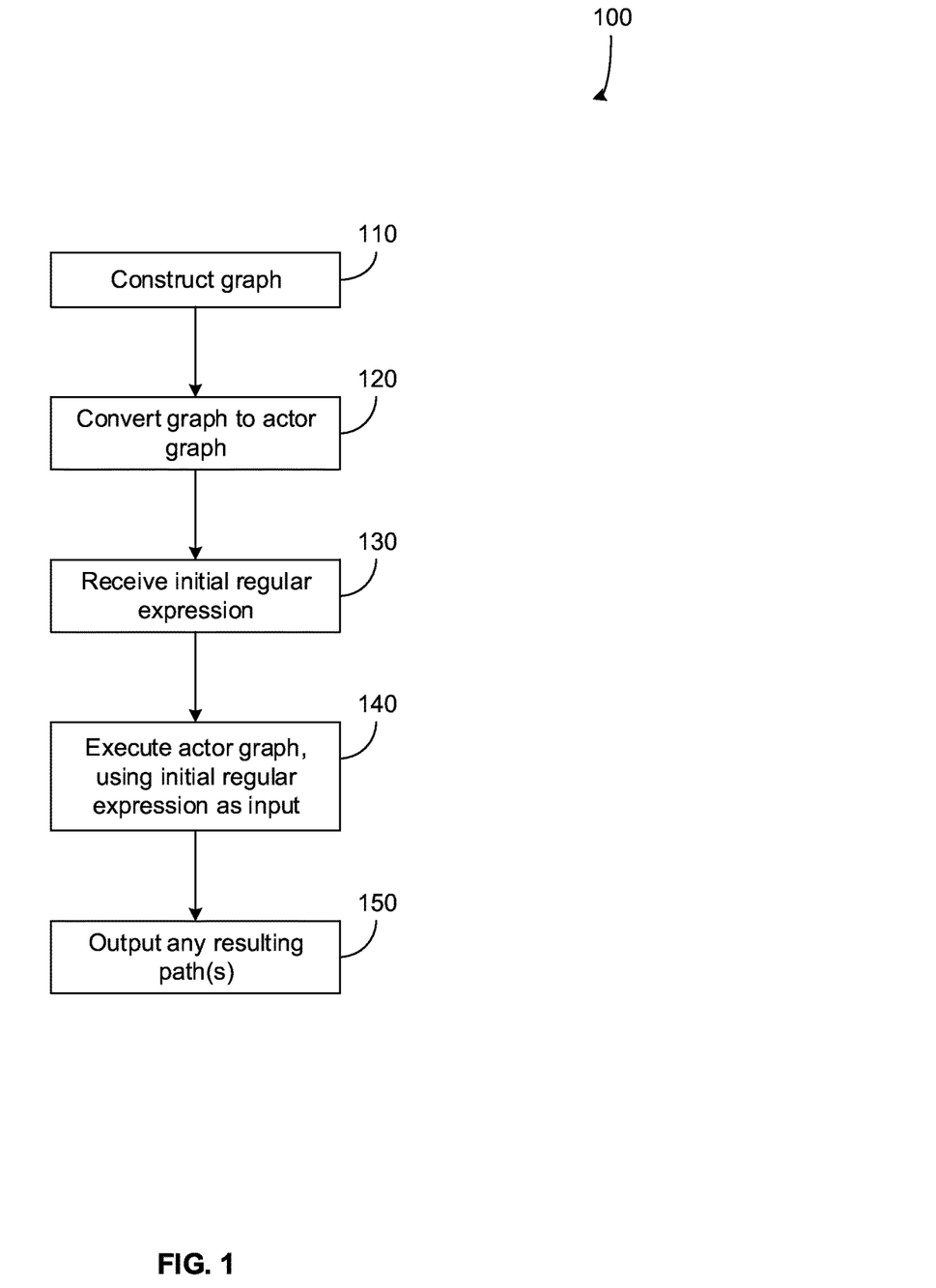
FIG. 1 illustrates processing of the system described herein, according to an embodiment.

Processing of the systems and methods described herein is illustrated in the process 100 of FIG. 1, according to an embodiment. At 110, a graph is constructed to model data that is to be analyzed. As noted above, the graph may be used to model a wide variety of information, e.g., a social network or the similarity between products or services. At 120, such a graph may be converted to an analogous actor graph. The analogous actor graph may be topologically identical to the original graph, but each vertex may be a functional unit capable of logical processing and communicating with connected vertices. Processing at a vertex of an actor graph will be described in greater detail below. Such processing may be implemented in software, firmware, hardware, or any combination thereof. In an embodiment, the processing of a vertex may be implemented as a process running on a programmable processor, for example.

In an alternative embodiment, the original data may be modeled directly as an actor graph, eliminating the need for 110.

At 130, an initial regular expression is received at a vertex of the actor graph. This expression specifies conditions that may be met by a path in the actor graph. A path that satisfies a regular expression meets the conditions specified therein. At 140, processing in the actor graph is performed, using the initial regular expression as input. At 150, any paths resulting from execution of the actor graph may be output. Such a path may be identified by its sequence of vertices or edges, for example. Note that with a given actor graph, 130-150 may be repeated with different regular expressions.

Figure 2:
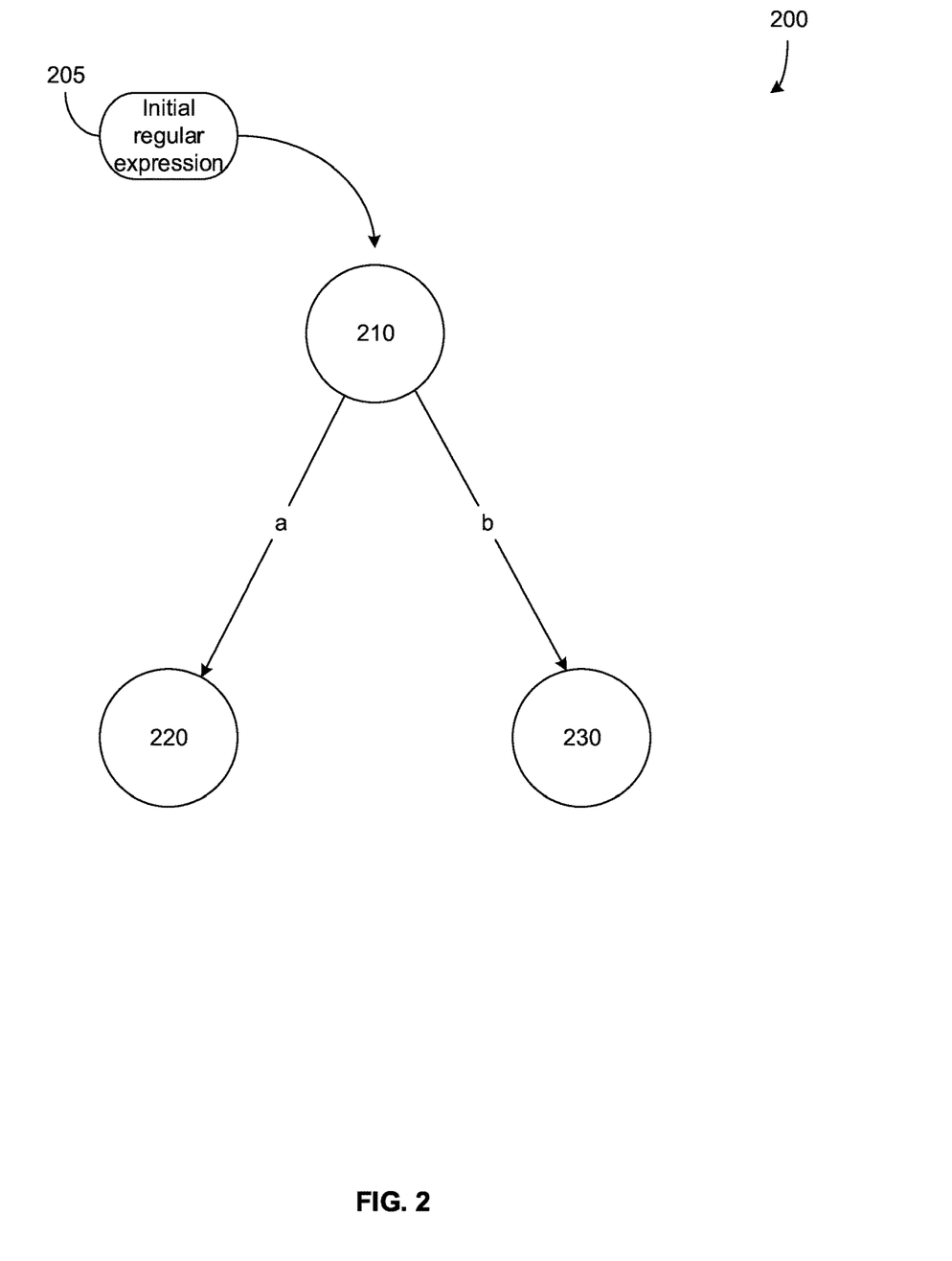
FIG. 2 illustrates execution of an actor graph, according to an embodiment.

Processing of an actor graph (or a subgraph thereof) is illustrated in example 200 of FIG. 2, according to an embodiment. An initial regular expression 205 may be input to a vertex 210. At this point, processing takes place at vertex 210, whereby each of the two edges and/or their connected vertices 220 and 230 are evaluated. In this evaluation, vertex 210 determines whether either branch satisfies the first condition specified in the initial regular expression. If, for example, the initial regular expression requires, as its first condition, that an edge have a value of b, then the right edge satisfies this condition. In this case, the initial regular expression may be modified, if necessary, to reflect that the first condition is satisfied. The modified expression may then be communicated to vertex 230. In some cases, the first condition may be satisfied, but the initial regular expression does not need to be modified. In such a situation, while the first condition is satisfied, the conditions of the initial regular expression do not change. In this case, the initial regular expression may be sent to the vertex 230 unchanged.

Vertex 230 may then proceed in a similar manner to the processing of vertex 210, evaluating edges that come from vertex 230 and the vertices connected to these edges (not shown), to determine which, if any, satisfy the first condition of the received regular expression.

Figure 3:
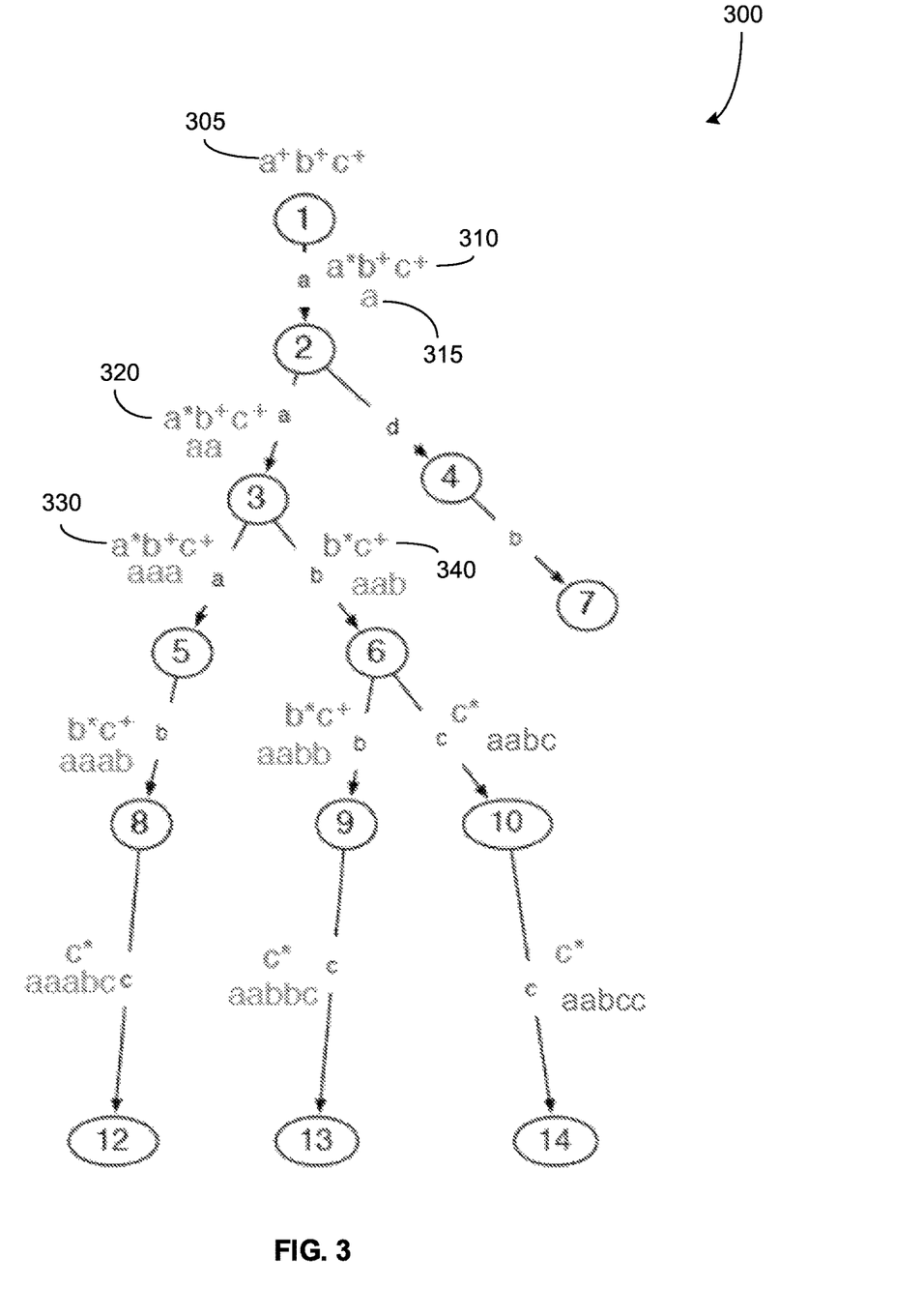
FIG. 3 illustrates execution of a more elaborate actor graph, according to an embodiment.

A more extensive example 300 is shown in FIG. 3. A regular expression 305 is input to the actor graph at vertex 1. The superscript "+" notation on the value a indicates that the next one or more edge in the path needs to have a value of a in order for the initial regular expression to be satisfied. The initial regular expression 305, $a^+b^+c^+$, therefore indicates that a path is sought, where the path consists of one or more consecutive edges that each have value a, followed by one or more consecutive edges that each have value b, followed by an edge having value c.

Vertex 1 may evaluate the edges emanating from it, to find one that satisfies the first subordinate condition of the initial regular expression 305, i.e., an edge with value a. In this case, there is only one edge coming from vertex 1, and it has a value a. This edge therefore satisfies the first subordinate condition of the initial regular expression. At this point, any path that will ultimately satisfy the initial regular expression 305, $a^+b^+c^+$, needs to have, from this point forward, zero or more consecutive edges each having value a, followed by one or more consecutive edges that each have value b, followed by one or more consecutive edges that each have a value c. Vertex 1 may therefore modify the initial regular expression $a^+b^+c^+$, to become the modified regular expression $a^*b^+c^+$, where the "*" superscript indicates that zero or more consecutive edges having value a are required next for the eventual path to satisfy the initial regular expression 305. This modified expression 310 may then be communicated from vertex 1 to the vertex connected to the identified edge, i.e., vertex 2. In the illustrated embodiment, the sequence consisting of the value a (shown as 315) is also communicated to vertex 2.

Expression 310 may therefore serve as input to vertex 2, which may then perform processing similar to that of vertex 1. Vertex 2 may evaluate the edges emanating from it, to find one that satisfies the received regular expression 310. In this case, there are two edges coming from vertex 2, one having value a, and another with value d. The expression 310 requires an edge that satisfies the condition of zero or more consecutive edges at the start, each having value a followed by one or more consecutive edges each having value b. Only one edge coming from vertex 2 satisfies this, i.e., the left edge that connects to vertex 3. The right edge, having value d, does not satisfy this condition, and may be ignored.

At this point, any path that will ultimately satisfy the expression 305, $a^+b^+c^+$, needs to have, from this point forward, zero or more consecutive edges each having value a, followed by one or more consecutive edges that each have value b, followed by an edge having value c. Vertex 2 may modify the received regular expression 310, $a^*b^+c^+$, if necessary. However, in this instance, modification is not necessary and is not performed; the requirement, from this point forward, remains $a^*b^+c^+$. This expression (320) is therefore communicated to the next vertex connected to this last identified edge, vertex 3. The sequence obtained so far, aa, may also be communicated to vertex 3.

At vertex 3, similar processing may take place. This vertex may evaluate the edges emanating from it. Here, expression 320 serves as input to vertex 3, which then performs processing similar to that of vertices 1 and 2. Vertex 3 evaluates the edges emanating from it, to find one that satisfies the received regular expression 320. There are two edges coming from vertex 3, one having value a, and another with value b. The expression 310 requires an edge that satisfies the condition of zero or more consecutive edges each having value a, followed by one or more consecutive edges each having value b. Both edges coming from vertex 3 satisfies this. The left edge (connecting to vertex 5) has value a, and the right edge (connecting to vertex 6) has a value b.

At this point, any path that will ultimately satisfy the initial regular expression 305, $a^+b^+c^+$, needs to have, from this point forward, zero or more consecutive edges each having value a, followed by one or more consecutive edges that each have value b, followed by an edge having value c. Vertex 3 may therefore modify the received regular expression 310, $a^*b^+c^+$, if necessary. In this instance, modification is not necessary with respect to vertex 5; the requirement, from this point forward, remains $a^*b^+c^+$. This expression is therefore communicated to the next vertex connected to this last identified edge, vertex 5, shown as expression 330. The sequence obtained so far, aaa, may also be communicated to vertex 5.

With respect to vertex 6, however, expression 320 is modified to expression 340. This latter expression takes into account the fact that the edge connecting to vertex 6 has value b. Recall that the initial expression 305 required one or more consecutive edges that each have value a, followed by one or more consecutive edges that each have value b, followed by an edge having value c. At this point, a path has been found having an edge of value a, followed by another edge of value a, followed by an edge of value b. Therefore, to satisfy the initial regular expression 305, from this point forward future edges must meet the conditions of zero or more consecutive edges each having a value b, followed by one edge having value c. Hence, the regular expression 320, $a^*b^+c^+$, is modified by vertex 3 to expression 340, $b^*c^+$, which is communicated by vertex 3 to vertex 6. In the illustrated embodiment, the sequence obtained so far in this latter path, aab, may also be sent to vertex 6.

Vertices 5 and 6 may then proceed in a similar fashion. In an embodiment, processing at these vertices may proceed in parallel in an embodiment. Alternatively, they may proceed serially. Eventually, three paths that satisfy the conditions of the initial regular expression 305 are found, as shown.

Generally, processing of an actor graph may proceed in a depth-first manner or in a breadth-first manner, or in some combination thereof.

In the examples of FIGS. 2 and 3, the regular expressions received at a current vertex describe conditions that may be met by edges that have particular values or weights. In alternative embodiments, the regular expression may specify conditions that may be met by the vertices connected to the current vertex. Such conditions may take the form of attributes of such vertices, data stored in these vertices, and/or values of variables contained in these vertices.

Figure 4:
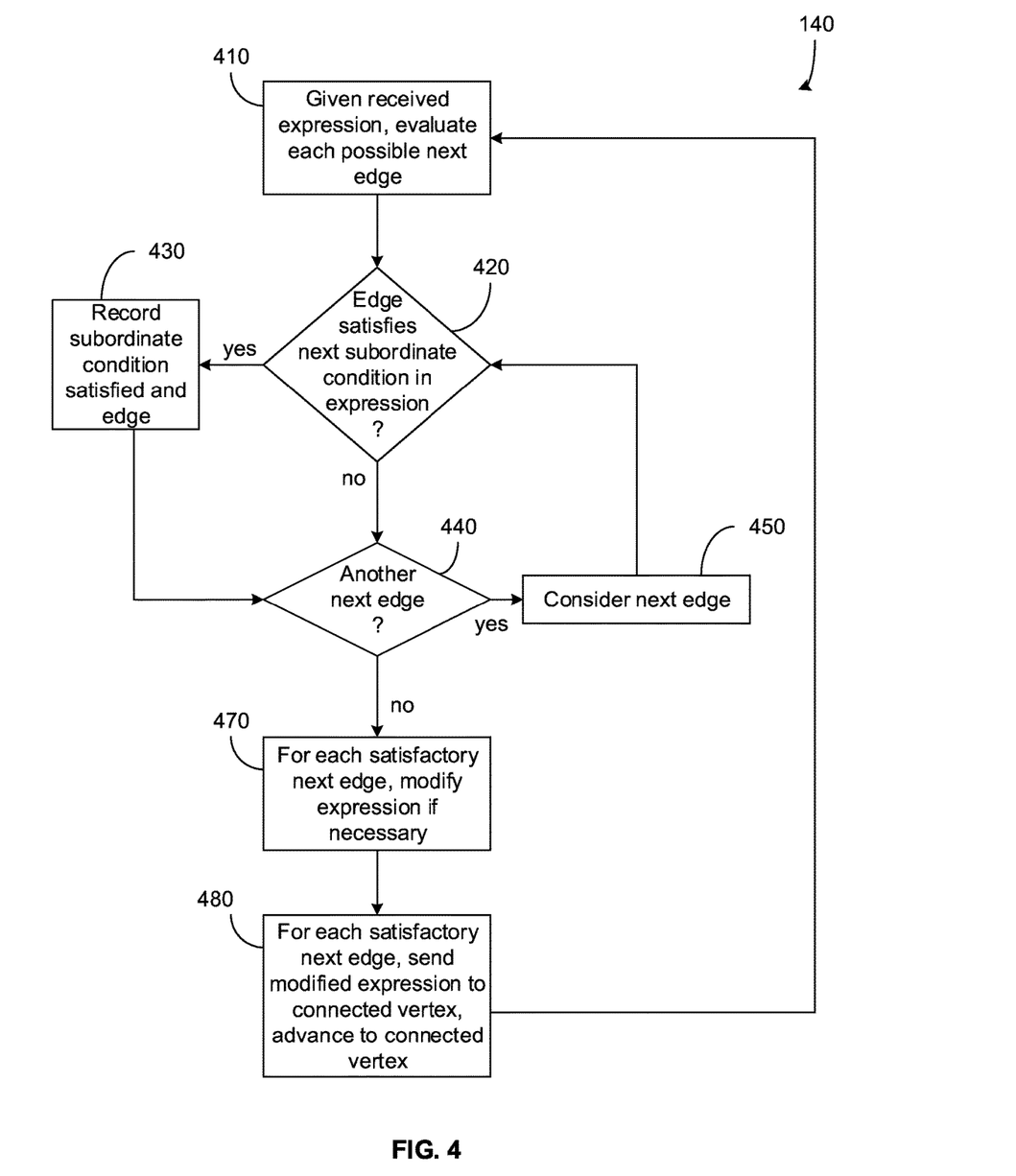
FIG. 4 is a flow chart illustrating the execution process, according to an embodiment.

The execution of an actor graph (140 of FIG. 1) is illustrated in FIG. 4, according to an embodiment. At 410, after receiving a regular expression as input, a vertex may evaluate one of the edges emanating from it. The objective in this evaluation is to determine, at 420, if this edge satisfies the next subordinate condition in the received regular expression. On the first iteration of this process, the "next subordinate condition" would be the first condition in the received expression. If the edge does not satisfy this condition, processing may continue at 440, where a determination may be made as to whether there are any other edges to be evaluated for the current vertex.

If the edge is found to satisfy this subordinate condition at 420, then at 430 the satisfied condition may be recorded, and the identity of this edge may be recorded. The edge may be identified for this purpose, for example, by identifying the vertices which it connects. At 440, a determination may be made as to whether there are any other edges to be evaluated by the current vertex.

If the determination of 440 is affirmative, then another edge emanating from the vertex may be considered at 450. Processing may then continue at 420, where it may be determined whether this latter edge satisfies the next subordinate condition in the expression. Otherwise, there are no further edges from the current vertex, and processing may continue at 470. Here, for each satisfactory next edge, the regular expression may be modified, if necessary, to reflect the satisfaction of the subordinate condition. At 480, the expression, possibly modified at 470, may be sent to the connected vertex at the far end of the satisfactory edge. Note that the expression may be modified differently, or not modified at all, depending on the particular edge that has been considered. As a result, different expressions may be sent to different connected vertices. The process may then reiterate at each of these connected vertices, at 410.

Note that in the illustrated embodiment, the satisfaction of conditions in a regular expression may be determined by evaluation of the edges emanating from a current vertex. As noted above however, the regular expression may alternatively or additionally specify conditions that may be met by the vertices connected to the current vertex. Such conditions may take the form of attributes of such vertices, data stored in these vertices, and/or values of variables contained in these vertices.

Figure 5:
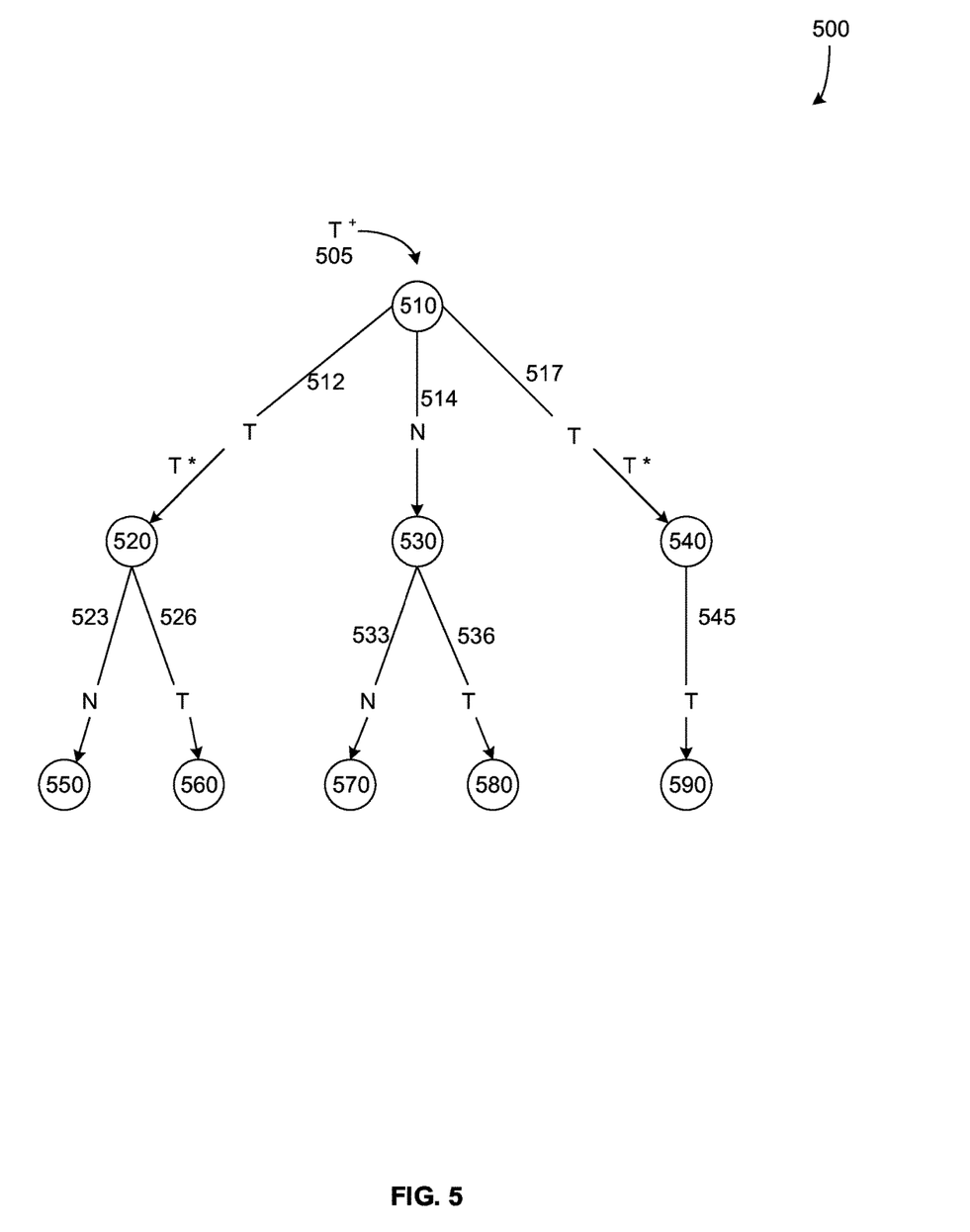
FIG. 5 is an example of execution of a graph that models a social network, according to an embodiment.

Another example of an actor graph is presented in FIG. 5, according to an embodiment. Here, the actor graph 500 may represent a social network, where the goal is to determine a path representing friends who may be trusted to offer reliable recommendations about a movie. Each vertex may represent a person in the social network, and each edge represents a connection in the network. The edges each have an associated value, T or N, which denotes the trustworthiness (T) of a person's judgment with respect to movies, or lack of trustworthiness (N).

An initial regular expression 505, $T^+$, may be input to the first vertex 510. This vertex may then evaluate the edges coming from it, i.e., edges 512, 514, and 517, to see which of these, if any, satisfies expression 505. Edge 514 does not, but edges 512 and 517 do, since these latter edges have a value T. Stated another way, the person represented by vertex 510 trusts the judgment of the persons represented by respective vertices 520 and 540, but does not trust the judgment of the person represented by vertex 530.

Because edge 512 satisfies the initial regular expression 505, vertex 510 may modify the expression 505, $T^+$, to a modified expression $T^*$. From this point, any further edge having a value of T would, in view of the previously identified value T for edge 512, satisfy the initial regular expression $T^+$. Therefore vertex 510 modifies $T^+$, to become $T^*$. This latter expression is then communicated to the vertex connected to the edge 512, vertex 520. Similarly, the expression $T^*$ is also communicated to vertex 540. In alternative embodiments, the sequence of satisfactory edge values (in this case, the sequence consisting of the value T) may also be communicated to connected vertices, as discussed above.

Vertex 520 may then evaluate the edges coming from it, edges 523 and 526. Of these, only edge 526 satisfies the modified expression $T^*$. Consequently, the path consisting of edges 512 and 526 is found to satisfy the initial regular expression 505, $T^+$.

Vertex 540 also evaluates the edges coming from it. In this case, there is only one edge emanating from vertex 540, edge 545. This edge satisfies the modified expression $T^*$. Consequently, the path consisting of edges 517 and 545 is also found to satisfy the initial regular expression $T^+$.

Note that the processing at vertices 520 and 540 may proceed in parallel or in serial. Moreover, note that once an edge having a value N is encountered, processing of a path with such an edge may stop at this point.

In an alternative embodiment, the processing described above may be modified to operate on graphs where the edges have particular weights. In such situations, it may be desirable to identify a particular path that satisfies a condition relating to the weights, e.g., that returns a path satisfying the regular expression and having a combined weight (summing over all the component edges of the path) meeting a predetermined requirement. In an embodiment, the returned path may have to have a minimal combined weight, i.e., the least of all the paths that satisfy the regular expression. In other embodiments, it may be desirable to return a path having a maximum combined weight (the greatest combined weight of all the paths that satisfy the regular expression). In an embodiment, a path satisfying such a condition may be identified using an implementation of the distributed Dykstra algorithm, as would be understood by a person of ordinary skill in the art.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate arrays (FPGA), logic gates, registers, semiconductor devices, chips, microchips, chip sets, modules composed of such elements, and so forth.

Examples of software may include software components, computer programs, application programs, system programs, machine programs, operating system software, middleware, firmware, software modules, routines, subroutines, functions, methods, procedures, software interfaces, application program interfaces (API), instruction sets, computing code, code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The terms software and firmware, as used herein, may refer to a computer program product including a computer readable medium having computer program logic stored therein to cause a computer system to perform one or more features and/or combinations of features disclosed herein. This computer program logic may represent control logic to direct the processing of the computer. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, random access memory (RAM), read-only memory (ROM), or other data storage device or tangible medium.

Figure 6:
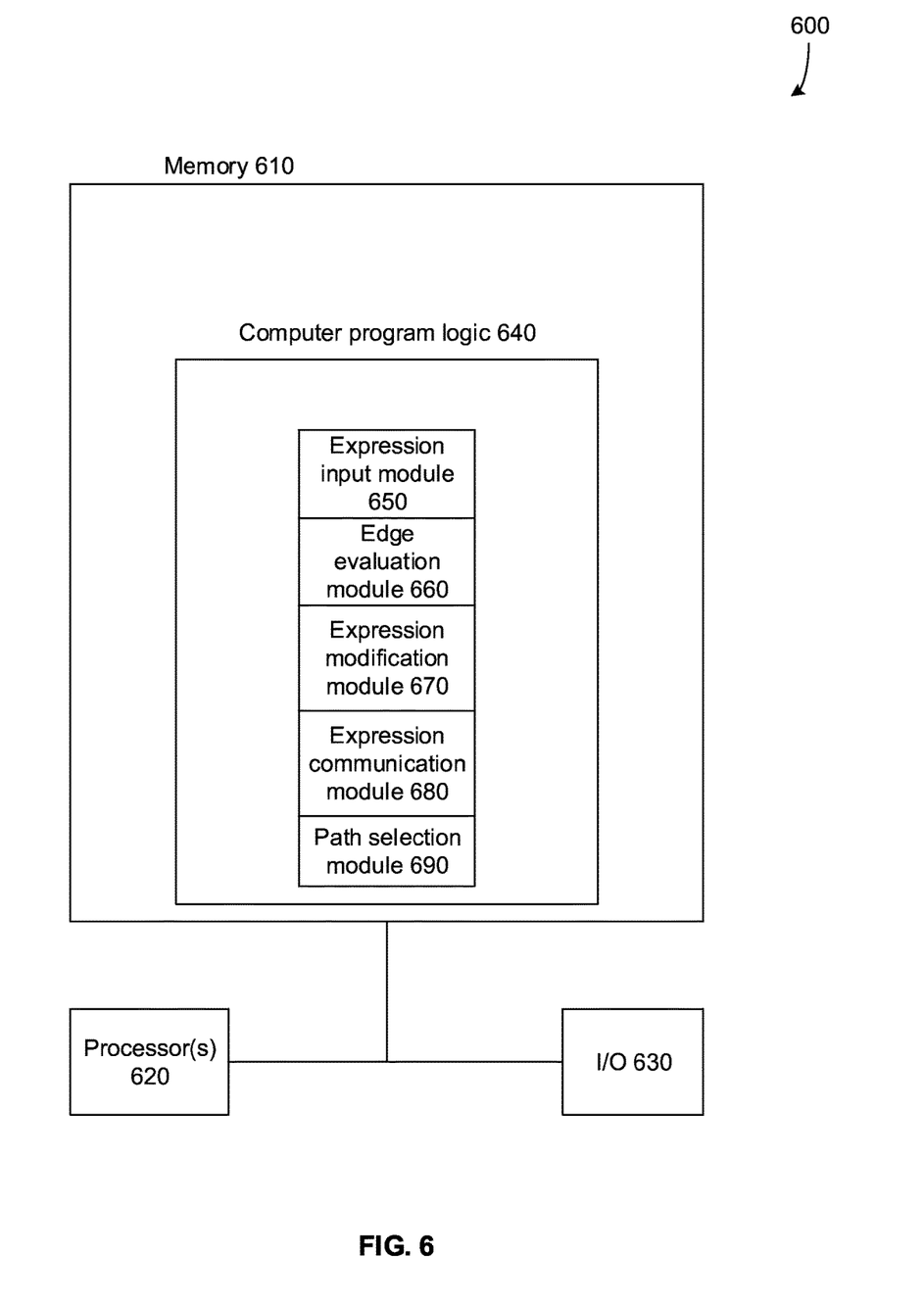
FIG. 6 is a block diagram illustrating a software or firmware embodiment.

A computing system that executes such software/firmware is shown in FIG. 6, according to an embodiment. The illustrated system 600 may represent a processor unit and may include one or more processor(s) 620 and may further include a body of memory 610. Processor(s) 620 may include one or more central processing unit cores and/or a graphics processing unit having one or more GPU cores. Memory 610 may include one or more computer readable media that may store computer program logic 640. Memory 610 may be implemented as a hard disk and drive, a removable media such as a compact disk, a read-only memory (ROM) or random access memory (RAM) device, for example, or some combination thereof. Processor(s) 620 and memory 610 may be in communication using any of several technologies known to one of ordinary skill in the art, such as a bus or point-to-point interconnect. Computer program logic 640 contained in memory 610 may be read and executed by processor(s) 620. One or more I/O ports and/or I/O devices, shown collectively as I/O 630, may also be connected to processor(s) 620 and memory 610.

Computer program logic 640 may include logic that embodies some or all of the processing described above. In the illustrated embodiment, computer program logic 640 may include a module 650 for the input, at a vertex, of a regular expression. Computer program logic 640 may also include an edge evaluation module 660. This module may contain logic for the consideration of the edges emanating from the vertex, to determine which edge(s) satisfy the received regular expression. As discussed above, in alternative embodiments, a vertex may also consider, in the evaluation process, attributes of connected vertices, such as data values stored therein, if the regular expression so specifies. Such evaluation of the connected vertices may also be performed in module 660.

Computer program logic 640 may also include an expression modification module 670, to modify the received regular expression if an edge (and/or the vertex connected thereto) satisfies a subordinate condition of the received regular expression. As noted above, in some situations, modification may not be necessary. Computer program logic 640 may also include a module 680 for communicating a modified expression (or the received expression, if no modification was performed) to a connected vertex.

In an embodiment where a path is to be identified meeting a combined weight requirement, computer program logic 640 may also include a path selection module 690 for identifying a particular path that meets the regular expression and meets the combined weight requirement. As noted above, such a module may implement a distributed Dykstra algorithm in order to identify such a path.

Moreover, program logic 640 may be embodied in and/or executed on behalf of a single vertex of an actor graph. Similar logic may be embodied in and/or executed on behalf of one or more other vertices in the actor graph in parallel or serially. The execution of program logic 640 for multiple vertices may take place as the execution of multiple processes or threads executing on a single computing system in an embodiment. Alternatively, operation of different vertices may take place in different processors or computing systems.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

The following examples pertain to further embodiments.

Example 1 is a system for identifying relationships between entities, comprising: a processor; and a memory in communication with said processor, send memory for storing a plurality of processing instructions for directing said processor to: create an actor graph, wherein vertices of said actor graph represent the entities and comprise units of executable logic enabling said vertices to communicate with each other; execute said actor graph using an initial regular expression as an input to said actor graph; and output data representing one or more paths in said actor graph, wherein said paths satisfy said initial regular expression.

Example 2 is the system of example 1, wherein the execution comprises: receiving said initial regular expression at a first vertex of the actor graph; at said first vertex, evaluating one or more of an edge that comes from the first vertex, and a second vertex at the end of said edge; if the evaluation satisfies a first condition of said initial regular expression, recording the identity of the second vertex; at said first vertex, modifying the initial regular expression to reflect the satisfaction of said first condition, if necessary; sending the modified regular expression to the second vertex if the initial regular expression has been modified; and sending the initial regular expression to the second vertex if the initial regular expression has not been modified.

Example 3 is the system of example 2, wherein the execution further comprises:

receiving said modified regular expression or said initial regular expression at the second vertex; at the second vertex, evaluating one or more of an edge that comes from the second vertex, and a third vertex at the end of said edge that comes from the second vertex; if the evaluation at the second vertex satisfies a first condition of said received regular expression, recording the identity of the third vertex; at said second vertex, modifying the received regular expression to reflect the satisfaction of said first condition, if necessary; sending the modified received regular expression to the third vertex if the received regular expression has been modified; and sending the received regular expression to the third vertex if the received regular expression has not been modified.

Example 4 is the system of example 3, wherein the actor graph represents a social network and said vertices of said actor graph represent persons in said social network.

Example 5 is the system of example 4, wherein each edge in said actor graph has an associated value representing a level of trust between corresponding persons represented by the vertices connected by the edge.

Example 6 is the system of example 3, wherein vertices of the actor graph represent respective products or services, and wherein each edge in the actor graph has an associated value representing a degree of similarity between corresponding products or services represented by the vertices connected by the edge.

Example 7 is the system of example 1, wherein each vertex comprises a value used in said evaluation.

Example 8 is the system of example 1, wherein each edge has an associated value used in said evaluation.

Example 9 is a method of identifying relationships between entities, comprising: creating an actor graph, wherein vertices of the actor graph represent the entities and comprise units of executable logic enabling the vertices to communicate with each other; at a programmable processor, executing the actor graph using an initial regular expression as an input to the actor graph; and outputting data representing one or more paths in the actor graph, wherein the paths satisfy the initial regular expression.

Example 10 is the method of example 9, wherein the execution comprises: receiving the initial regular expression at a first vertex of the actor graph; at the first vertex, evaluating one or more of an edge that comes from the first vertex, and a second vertex at the end of the edge; if the evaluation satisfies a first condition of the initial regular expression, recording the identity of the second vertex; at the first vertex, modifying the initial regular expression to reflect the satisfaction of the first condition, if necessary; sending the modified regular expression to the second vertex if the initial regular expression has been modified; and sending the initial regular expression to the second vertex if the initial regular expression has not been modified.

Example 11 is the method of example 10, wherein the execution further comprises: receiving the modified regular expression or the initial regular expression at the second vertex; at the second vertex, evaluating one or more of an edge that comes from the second vertex, and a third vertex at the end of the edge that comes from the second vertex; if the evaluation at the second vertex satisfies a first condition of the received regular expression, recording the identity of the third vertex; at the second vertex, modifying the received regular expression to reflect the satisfaction of the first condition, if necessary; sending the modified received regular expression to the third vertex if the received regular expression has been modified; and sending the received regular expression to the third vertex if the received regular expression has not been modified.

Example 12 is the method of example 11, wherein the actor graph represents a social network and the vertices of the actor graph represent persons in the social network.

Example 13 is the method of example 12, wherein each edge in the actor graph has an associated value representing a level of trust between corresponding persons represented by the vertices connected by the edge.

Example 14 is the method of example 11, wherein vertices of the actor graph represent respective products or services, and wherein each edge in the actor graph has an associated value representing a degree of similarity between corresponding products or services represented by the vertices connected by the edge.

Example 15 is the method of example 9, wherein each vertex comprises a value used in the evaluation.

Example 16 is the method of example 9, wherein each edge has an associated value used in the evaluation.

Example 17 is one or more computer readable media having computer control logic stored thereon for identifying relationships between entities, the computer control logic comprising logic configured to cause a processor to: create an actor graph, wherein vertices of the actor graph represent entities and comprise units of executable logic enabling the vertices to communicate with each other; execute the actor graph using an initial regular expression as an input to the actor graph; and output data representing one or more paths in the actor graph, wherein the paths satisfy the initial regular expression.

Example 18 is the computer readable media of example 17, wherein the execution comprises: receiving the initial regular expression at a first vertex of the actor graph; at the first vertex, evaluating one or more of an edge that comes from the first vertex, and a second vertex at the end of the edge; if the evaluation satisfies a first condition of the initial regular expression, recording the identity of the second vertex; at the first vertex, modifying the initial regular expression to reflect the satisfaction of the first condition, if necessary; sending the modified regular expression to the second vertex if the initial regular expression has been modified; and sending the initial regular expression to the second vertex if the initial regular expression has not been modified.

Example 19 is the computer readable media of example 18, wherein the execution further comprises: receiving the modified regular expression or the initial regular expression at the second vertex; at the second vertex, evaluating one or more of an edge that comes from the second vertex, and a third vertex at the end of the edge that comes from the second vertex; if the evaluation at the second vertex satisfies a first condition of the received regular expression, recording the identity of the third vertex; at the second vertex, modifying the received regular expression to reflect the satisfaction of the first condition, if necessary; sending the modified received regular expression to the third vertex if the received regular expression has been modified; and sending the received regular expression to the third vertex if the received regular expression has not been modified.

Example 20 is the computer readable media of example 19, wherein the actor graph represents a social network and the vertices of the actor graph represent persons in the social network.

Example 21 is the computer readable media of example 20, wherein each edge in the actor graph has an associated value representing a level of trust between corresponding persons represented by the vertices connected by the edge.

Example 22 is the computer readable media of example 19, wherein vertices of the actor graph represent respective products or services, and wherein each edge in the actor graph has an associated value representing a degree of similarity between corresponding products or services represented by the vertices connected by the edge.

Example 23 is the computer readable media of example 17, wherein each vertex comprises a value used in the evaluation.

Example 24 is the computer readable media of example 17, wherein each edge has an associated value used in the evaluation.

Example 25 is a machine-readable storage including machine-readable instructions which, when executed, implement a method or realize an apparatus for identifying relationships between entities as described in any preceding example.

Example 26 is the system of example 3, wherein vertices of the actor graph represent respective products or services, and wherein each edge in the actor graph has an associated value representing a degree of similarity between corresponding products or services represented by the vertices connected by the edge.

Example 27 is the method of example 11, wherein the actor graph represents a social network and the vertices of the actor graph represent persons in the social network, and wherein each edge in the actor graph has an associated value representing a level of trust between corresponding persons represented by the vertices connected by the edge.

Example 28 is a machine readable medium including code for identifying relationships between entities, wherein the code, when executed, causes a machine to perform the method of any one of examples 9-16.

What is claimed is:

1. An apparatus, comprising a processor and memory arranged to:
   construct an actor graph in which vertices represent entities and in which edges between the vertices represent relationships amongst the respective entities, in which vertices comprise independently acting units of computation, and in which said independently acting units of computation communicate with each other;
   evaluate the actor graph to identify a path that satisfies a regular expression, including to,
      with a first independently acting unit of computation, evaluate a first vertex of the actor graph based on the regular expression to determine if an edge of the first vertex satisfies a first one of multiple sequential conditions of the regular expression,
      when the edge of the first vertex satisfies the first one of multiple sequential conditions of the regular expression, with the first independently acting unit of computation, send a message along the path from the first independently acting unit of computation to a second independently acting unit of computation at a second vertex at an end of the edge,
      wherein the message comprises a first and a second component, the first component to encode a prefix that has been satisfied and the second component to encode the regular expression modified to reflect the remaining multiple sequential conditions to be satisfied,
      wherein the processor includes a plurality of independently acting logic circuits to perform the independently acting units of computations of the vertices, with the independently acting logic circuit of each vertex to receive the message, and to store and compute intermediate values of the vertex to determine the first and second components of a next message to be sent along the path;
   wherein to construct the actor graph and to evaluate the actor graph includes to perform, at the independently acting logic circuits, an evaluation of a regular path query (RPQ) of a graph from which the actor graph is adapted, independently of a size of the graph and independently of a number of the multiple sequential conditions included in the regular expression of the RPQ; and
   wherein the edge of the first vertex is one of a plurality of weighted edges and to evaluate the actor graph to identify the path for the message that satisfies the regular expression includes to satisfy a condition relating to the plurality of weighted edges.

2. The apparatus of claim 1, wherein the apparatus is a first apparatus and the edge is a first edge, and wherein the message is received at the second independently acting unit of computation by a second apparatus, and the second vertex and a second edge that comes from the second vertex are evaluated based on the modified regular expression, wherein the first and second apparatuses are different apparatuses.

3. The apparatus of claim 1, wherein to modify the first one of the multiple sequential conditions comprises to reflect the satisfaction of the first one of the multiple sequential conditions.

4. The apparatus of claim 1, wherein the independently acting units of computation are further arranged to:
   construct the actor graph as a social network graph in which the vertices represent persons of a social network.

5. The apparatus of claim 4, wherein the independently acting units of computation are further arranged to:
   associate a value with each edge indicative of a level of trust between persons represented by vertices of the respective edges.

6. The apparatus of claim 1, wherein vertices of the actor graph represent items that include one or more of products and services, and wherein the independently acting units of computation are further arranged to:
   assign a value to each edge indicative of similarity of items represented by vertices of the respective edge.

7. The apparatus of claim 1, wherein the independently acting units of computation are further arranged to:
   evaluate the actor graph based on the regular expression and values assigned to vertices of the actor graph.

8. The apparatus of claim 1, wherein the prefix has been satisfied at the first vertex or a previous vertex.

9. The apparatus of claim 1, wherein to identify the path that satisfies the regular expression and satisfies a condition relating to the plurality of weighted edges includes identifying a path including a predetermined requirement of a combined weight.

10. A method, comprising:
constructing, by a computer processor, an actor graph in which vertices represent entities and edges between the vertices represent relationships amongst the respective entities, in which vertices comprise independently acting units of computation, and in which said independently acting units of computation communicate with each other;
with a first independently acting unit of computation, evaluating the actor graph to identify a path that satisfies a regular expression, including
evaluating a first vertex of the actor graph based on the regular expression to determine if an edge of the first vertex satisfies a first one of multiple sequential conditions of the regular expression,
when the edge of the first vertex satisfies the first one of multiple sequential conditions of the regular expression, with the first independently acting unit of computation, sending a message along the path from the first independently acting unit of computation to a second independently acting unit of computation at a second vertex at an end of the edge, wherein the message comprises a first and a second component, the first component to encode a prefix that has been satisfied and the second component to encode the regular expression modified to reflect the remaining multiple sequential conditions to be satisfied,
wherein the computer processor includes a plurality of independently acting logic circuits to perform the independently acting units of computations of the vertices, with the independently acting logic circuit of each vertex to receive the message, and to store and compute intermediate values of the vertex to determine the first and second components of a next message to be sent along the path,
wherein constructing the actor graph and evaluating the actor graph includes to perform, at the independently acting logic circuits, an evaluation of a regular path query (RPQ) of a graph from which the actor graph is adapted, independently of a size of the graph and independently of a number of the multiple sequential conditions included in the regular expression of the RPQ; and
wherein the edge of the first vertex is one of a plurality of weighted edges and evaluating the actor graph to identify the path for the message that satisfies the regular expression includes to satisfy a condition relating to the plurality of weighted edges.

11. The method of claim 10, further comprising receiving the message at the second independently acting unit of computation and, by the second independently acting unit of computation, evaluating the second vertex and a second edge that comes from the second vertex based on the modified regular expression, wherein the first and second independently acting units of computation are provided by different computers.

12. The method of claim 10, further comprising constructing the actor graph as a social network graph in which the vertices represent persons of a social network.

13. The method of claim 12, wherein constructing the actor graph further includes associating a value with each edge indicative of a level of trust between persons represented by vertices of the respective edges.

14. The method of claim 10, wherein vertices of the actor graph represent items that include one or more of products and services, and wherein constructing further includes assigning a value to each edge indicative of similarity of items represented by vertices of the respective edge.

15. The method of claim 10, wherein evaluating the actor graph further includes evaluating the actor graph based on the regular expression and values assigned to vertices of the actor graph.

16. The method of claim 10, wherein evaluating the actor graph further includes evaluating the actor graph based on the regular expression and values assigned to edges of the actor graph.

17. A non-transitory computer readable medium encoded with a computer program that includes instructions to cause a computer processor, in response to execution of the computer program, to:
construct an actor graph in which vertices represent entities and edges between the vertices represent relationships amongst the respective entities, in which vertices comprise independently acting units of computation, and in which said independently acting units of computation communicate with each other;
evaluate the actor graph to identify a path that satisfies a regular expression, including to
with a first independently acting unit of computation, evaluate a first vertex of the actor graph based on the regular expression to determine if an edge of the first vertex satisfies a first one of multiple sequential conditions of the regular expression, and
when the edge of the first vertex satisfies the first one of multiple sequential conditions of the regular expression, with the first independently acting unit of computation, send a message along the path from the first independently acting unit of computation to a second independently acting unit of computation at a second vertex at an end of the edge, wherein the message comprises a first and a second component, the first component to encode a prefix that has been satisfied and the second component to encode the regular expression modified to reflect the remaining multiple sequential conditions to be satisfied,
wherein a plurality of independently acting logic circuits to perform the independently acting units of computations of the vertices, with the independently acting logic circuit of each vertex to receive the message, and to store and compute intermediate values of the vertex to determine the first and second components of a next message to be sent along the path;
wherein to construct the actor graph and to evaluate the actor graph includes to perform, at the independently acting logic circuits, an evaluation of a regular path query (RPQ) of a graph from which the actor graph is adapted, independently of a size of the graph and independently of a number of the multiple sequential conditions included in the regular expression of the RPQ; and
wherein the edge of the first vertex is one of a plurality of weighted edges and to evaluate the actor graph to identify the path for the message that satisfies the regular expression includes to satisfy a condition relating to the plurality of weighted edges.

18. The non-transitory computer readable medium of claim 17, wherein the processor is a first processor and further including instructions to cause a second processor to receive the message at the second independently acting unit of computation and evaluate the second vertex and a second edge that comes from the second vertex based on the modified regular expression.

19. The non-transitory computer readable medium of claim 17, further including instructions to cause the first independently acting unit of computation to modify the first one of the multiple sequential conditions to reflect the satisfaction of the first one of the multiple sequential conditions.

20. The non-transitory computer readable medium of claim 17, further including instructions to cause the first independently acting unit of computation to construct the actor graph as a social network graph in which vertices represent persons of a social network.

21. The non-transitory computer readable medium of claim 20, further including instructions to cause the first independently acting unit of computation to associate a value with each edge indicative of a level of trust between persons represented by vertices of the respective edges.

22. The non-transitory computer readable medium of claim 17, wherein vertices of the actor graph represent items that include one or more of products and services, further including instructions to cause the first independently acting unit of computation to
assign a value to each edge indicative of similarity of items represented by vertices of the respective edge.

23. The non-transitory computer readable medium of claim 17, further including instructions to cause the first independently acting unit of computation to evaluate the actor graph based on the regular expression and values assigned to edges of the actor graph.

* * * * *